United States Patent Office 3,635,928
Patented Jan. 18, 1972

3,635,928
MANUFACTURE OF POLYVINYL CHLORIDE
Jean Claude Thomas, Lyon, Rhone, France, assignor to Produits Chimiques Pechiney-Saint-Gobain, Paris, France
No Drawing. Filed Apr. 26, 1966, Ser. No. 545,304
Claims priority, application France, Apr. 30, 1965, 15,363
Int. Cl. C08f 45/00, 29/18
U.S. Cl. 260—92.8  9 Claims

ABSTRACT OF THE DISCLOSURE

Prior practice of making homogeneous resins of vinyl chloride containing adjuvants such as stabilizers, plasticizers, lubricants, fillers and antioxidants has involved intense mechanical working, for instance on a roll mill, and has proved to be difficult of satisfactory execution. Frequently such processes produced products possessed of potential instability, introduced by the heat of the mixing operation, which appeared during later operations on the resin. Lack of homogeneity was also known, producing inferior products. The present process of preparing finely divided polymers in powders and granular forms accomplishes the loading and homogenization of the particles with their working adjuvants by bringing an organic carrier liquid containing the adjuvants in solution or suspension into contact with the pulverulent, solid polymer to be loaded, with agitation which accomplishes a thorough mixing of the two phases and the transfer of the adjuvants from the liquid to the polymer. The transfer is seemingly accomplished by sorption, and is substantially complete, but the applicant is not bound by any theory of transfer. After the transfer has been accomplished the carrier liquid is evaporated off and reused.

---

This invention relates to the preparation of polymeric compositions having a polyvinyl chloride base containing the vinyl resin and its working adjuvants in granules or powder capable of being transformed to its ultimate shapes by direct molding, calendering, extrusion, and injection without intermediate treatment.

The working adjuvants used to modify the properties of polyvinyl chloride resins, those having homopolymeric or copolymeric vinyl chloride, fall into recognized classes all of which are compatible with the polymers;

Stabilizers: examples of which are organic salts of tin, of lead, organic salts of alkali and alkali earth metals, and epoxidated soybean oil;

Plasticizers: examples of which are butyl, octyl, and dodecyl phthalates, sebacates, and adipates and chlorinated paraffines;

Lubricants: examples of which are vegetable and synthetic waxes;

Fillers: examples of which are calcium carbonate, surface treated or not, titanium compounds such as rutile and anatase, alumina compounds, and silicas either burnt or precipitated;

Antioxidants: for instance dibutyl para cresol; antistatics, and pigments of standard types.

Such working adjuvants for polyvinyl chloride are well known, are recited in various publications, and have compatibility with polyvinyl chloride as a property.

Prior practice of making homogeneous resins from such ingredients has involved intense mechanical working, for instance on a roll mill, and has proved to be difficult of satisfactory execution. Frequently such processes produced products possessed of potential instability, introduced by the heat of the mixing operation, which appeared during later operations on the resin. Lack of homogeneity was also known, producing inferior products.

It is an object of this invention to introduce the working adjuvants easily to polymers of vinyl chloride, a term which includes homo- and co-polymers, while the polymers are finely divided, with only mild agitation, excluding heavy mechanical working and the machines therefor, and with the production of finely divided products of substantially uniform composition of resin and working adjuvants.

The objects of the invention are accomplished, generally speaking, by a method of loading a finely divided thermoplast comprising homopolymeric and/or copolymeric vinyl chloride with its working adjuvants which comprises mingling the adjuvants in an organic carrier in the liquid state in which they are from dispersible to soluble and the thermoplast is insoluble, permeating under pressure the granular mass with the liquid and impregnating the particles of the thermoplast with the adjuvants by sorption, by agitating and intimately intermixing the particles and the organic liquid carrier in contact with each other, and removing the stripped organic liquid carrier.

This novel process is applicable to all polymers of vinyl chloride by whatever process produced, whether in mass, in emulsion, in solution, in suspension, and whether grafted or not, to produce grains each of which contains its own content of such adjuvants. The transfer of working ingredients is successful whether the carrier liquid is applied to aged polymer after storage or to fresh polymer before it is discharged from the polymerization step. In practicing the process the working adjuvants are dissolved or suspended in an organic liquid carrier which is not a solvent for the resin, and which will be liquid when put in contact therewith. The granular product is ready for use in shaping articles without further treatment.

The process of preparing finely divided polymers in powders and granular forms accomplishes the loading and homogenization of the particles with their working adjuvants by bringing an organic carrier liquid containing the adjuvants in solution or suspension into contact with the polymer to be loaded, with agitation which accomplishes a thorough mixing of the two phases and the transfer of the adjuvants from the liquid to the polymer. The transfer is seemingly accomplished by sorption, and is substantially complete, but the applicant is not bound by any theory of transfer. After the transfer has been accomplished the carrier liquid is evaporated off and reused.

In a first form of the novel process the polymers and their working adjuvants are mixed in granular form and the carrier liquid is added to the mixture with agitation of the whole.

In a second form of the novel process the working adjuvants are mixed with the carrier liquid and the loaded carrier liquid is mixed with the finely divided polymers, agitation proceeding until the transfer of the adjuvants from the liquid to the polymer is complete.

In a third form of the invention the three ingredients, the polymer, the carrier liquid, and the working adjuvants are added simultaneously to a mixer.

In a fourth and very valuable form of the invention the loaded carrier liquid is added to the polymerization apparatus at the polymerization's end; there will be no polymerization on the loaded polymer.

Examples of the vinyl chloride polymers which have been benefited by this novel process are polyvinyl chloride of all molecular weights and degrees of polymerization, copolymers e.g. vinyl chloride and vinyl acetate, and copolymers grafted by unsaturated monomers.

Among the organic liquid carriers which act as solvents or dispersants for the working adjuvants and which are not solvents for vinyl chloride polymers are halogenated hydrocarbons, such as vinyl chloride which is gaseous at ordinary temperature and pressure but liquid at the temperatures and pressures employed, alkyl and alkylene halides such as methyl chloride, methylene chloride, ethyl chloride, methyl bromide, and halogenated hydrocarbons in general but especially those in which some halogen is fluorine, for instance dichlorodifluoromethane, dichlorotetrafluoroethane, trichloromonofluoromethane, and pentachloromonofluoroethane. These organic carrier liquids possess those qualities which best adapt an organic liquid to the present use, they are chemically inert to polymers and working adjuvants, they are nonsolvents for the polymers but good solvents for the plasticizers and most of the other working adjuvants, they produce a very fine dispersion of dispersed phases, they are chemically and physically stable at the temperatures employed in hot operations in which they are engaged, and they are readily removed from the polymer, after the transfer of their ingredients, by venting, vacuum, or other forms of degassing.

It is advantageous to degas the polymer before the treatment, e.g. in another vessel than that used for polymerization. It is also advantageous to accomplish the loading of the polymer grains at temperatures on the order of 50°–100° C., preferably between about 60° and 80° C. with agitation. The transfer of working adjuvants is carried out under pressure, and the removal of the stripped carrier liquid can be accomplished by venting the autoclave and recovering the carrier liquid as it escapes for loading and recycling.

The products produced by this process are dry and include everything from dry stable polymers for the formation of rigid structures to polymers containing as much as 130% of plasticizer.

The following examples illustrate the invention without limiting the generality of what is elsewhere herein set forth. Unless otherwise specified the autoclave of Example 5 was used in the examples, as it is effective at room temperature or elevated pressures and has excellent stirring action.

EXAMPLE 1

This example describes the preparation of a composition which can be used as soon as formed, or after storage, in the pneumatic extrusion of hollow rigid bodies.

The mixing apparatus was an autoclave provided with a stirrer, ports of supply and discharge, means to measure the quantities added, and a heat exchange jacket.

135 kg. of polyvinyl chloride, from production in mass, of K index (Fikentscher) 56, and 15 kg. of a grafted copolymer from the grafting polymerization of a mixture of 40 parts of butadiene and 10 parts of acrylic nitrile onto 50 parts of polyvinyl chloride were put into the mixer and the helical agitator was rotated at 30 r.p.m. 3 kg. of glycerol monoricinoleate, 0.9 kg. of cetyl palmitate, 3 kg. of epoxidated soya bean oil, and 2.7 kg. of dioctyl thio thin were added and the autoclave was closed.

70 kg. of monomeric vinyl chloride were injected at liquefying pressure, the mass was heated to 60° C. in 10 minutes, with continuing agitation, for another 15 minutes, the autoclave was vented, and the monomer was recovered, in another 15 minutes. The autoclave was then put under vacuum three times in 15 minutes which eliminated vinyl chloride from the polymer grains. The product was homogeneous, dry, nontacky, and ready for use.

EXAMPLE 2

This example describes the manufacture of highly plasticized polyvinyl chloride. The apparatus was as in Example 1.

100 kg. of polyvinyl chloride screened to 250 microns, of K index 69, were put in the mixer, the agitator was rotated at 30 r.p.m. and 128 kg. of dioctyl phthalate, 3 kg. of ethylhexyl epoxystearate, 1 kg. of barium-cadmium laurate, and 0.5 kg. of decyl diphenyl phosphite were admitted. The autoclave was closed and 100 kg. of vinyl chloride were injected. The mass was rapidly heated to 80° C., which required about 15 minutes. After 15 minutes at 80° C., the agitation continuing, the monomer was released and entirely discharged from the granular product by three successive subjections to vacuum. Total degassing took 30 minutes.

The product was a dry nontacky powder which poured readily and did not form lumps.

When attempts were made to obtain similar products by intense mechanical working the products were noticeably humid, tacky, formed lumps readily, and after storage required substantial power consumption to separate them into grains before they could be similarly used.

The new products have a potential of thermal stability so superior to that of compositions prepared by classical methods that one can obtain the same stabilizing effect with 30 to 50% less stabilizer.

EXAMPLE 3

This example prepares a filled polyvinyl chloride which is useful in making cable cover tubes by extrusion. The same apparatus was employed.

100 kg. of polyvinyl chloride, screened to 250 microns, of K index 68 were introduced and agitated at 30 r.p.m. while 50 kg. of dioctyl phthalate, 4 kg. of dibasic lead phthalate and 38 kg. of $CaCO_3$ were added. The autoclave was closed and 60 kg. of vinyl chloride were injected, the pressure rising until much of the vinyl charge was liquid, covering the mass of ingredients. The temperature was raised to 80° C. in 15 minutes and the mixture was treated for another 45 minutes, agitation continuing. The autoclave was vented, subjected to six sharp reductions in pressure. The total time required for degassing was about 45 minutes. The product was homogeneous and was used to extrude tubes, which proved to be of excellent quality.

EXAMPLE 4

This example describes the preparation of a plasticized composition which includes a copolymer of vinyl chloride and vinyl acetate and polyvinyl chloride in the ratio 25:75. The same autoclave was used.

25 kg. of a 95:5 copolymer of vinyl chloride and vinyl acetate having an index of viscosity of 100, which had been prepared by copolymerization in suspension, and 75 kg. of polyvinyl chloride which had been obtained by polymerization in mass, and which had a K index of 75, were put into the autoclave in which agitator was turning at 30 r.p.m. 80 kg. of dioctyl phthalate, 3 kg. of ethylhexyl epoxystearate, 1.5 kg. of barium-cadmium laurate, 0.5 kg. of decyl diphenyl phosphite, and 1 kg. of stearic acid were added to the agitated mass. The autoclave was closed and 50 kg. of vinyl chloride were injected. The mass was rapidly heated to 60° C. and agitated for 15 minutes. The autoclave was vented and the last traces of vinyl chloride were eliminated by three treatments under vacuum within 15 minutes. The total time of degassing was 30 minutes. The composition was a dry, nontacky powder which poured well and did not form lumps in storage.

When an attempt was made to make such compositions by intense mechanical mixing the product was noticeably humid, tacky, drew together in lumps and did not withstand storage well, which required a large input of energy to prepare the material for use.

EXAMPLE 5

In this example the homogeneous impregnation of the polymers was carried out at the end of the polymerization in the apparatus in which it took place.

A horizontal, fixed autoclave of stainless steel having a capacity of 500 l. which contained a rotary, helical agitator working close to the wall received 200 kg. of monomeric vinyl chloride after it had been purged of air, and 40 g. of azodiisobutyronitrile catalyst. The temperature was raised rapidly to 62° C. which corresponded to a relative internal pressure of 9.5 bars. The helical agitator was run at 100 r.p.m. for 2 hours during which 10% polymerization took place. The speed of the agitator was then reduced to 30 r.p.m. and polymerization was continued for 10 hours, at which time 2 kg. of calcium stearate were added as a stabilizer and 800 g. of vegetable wax as a lubricant. Agitation continued for 30 minutes longer, the autoclave was vented, the excess monomer recovered, and a yield of 70% of a polymer powder was obtained. The polymer was ready for use without other preparation in injection and molding to form rigid objects.

EXAMPLE 6

This example relates to the preparation of polyvinyl chloride compositions in two steps in a single apparatus. Into the autoclave described in the preceding example, which was equipped in both cases with a heat exchange jacket, there were introduced 200 kg. of vinyl chloride; after purging the air by releasing some of the vinyl chloride, 40 g. of azodiisobutyronitrile were inserted as catalyst. The rotor was run at 100 r.p.m., the temperature was taken immediately at 62° C., and after 2 hours the agitator was reduced to 30 r.p.m., the polymerization continuing 10 hours. At that moment the autoclave received the following mixture of ingredients: 12.5 kg. of dioctyl phthalate, 15 kg. of didecyl adipate, 5 kg. of ethylhexyl epoxystearate, 2 kg. of barium-cadmium laurate, 0.5 kg. of phenolic type antioxidants, 1.7 kg. of wax lubricant, and 50 kg. of vinyl chloride. When this introducton had been completed the agitation was continued for another 30 minutes and the unreacted vinyl chloride was vented and recovered. The composition was a powder of polyvinyl chloride of which 80% was polymer. This material is particularly useful for the extrusion of semirigid profiles of excellent quality, smooth surface and which contain no ungelled grains.

EXAMPLE 7

This process describes the preparation of a copolymer of polyvinyl chloride and a grafted copolymer for the pneumatic molding of hollow rigid bodies. This operation is carried out in an apparatus which includes an autoclave mixer provided with apertures of supply and discharge and with apparatus to measure the quantities admitted to the autoclave.

The autoclave received 135 kg. of polyvinyl chloride of a type which had been produced in suspension and which had a K index of 56, 15 kg. of a grafted copolymer obtained by the polymerization of a mixture of 40 parts of butadiene and 10 parts of acrylic nitrile onto 50 parts of polyvinyl chloride. The agitator was started at 30 r.p.m. and 3 kg. of glycerol monoricinoleate, 0.9 kg. of a cetyl palmitate, 3 kg. of epoxidated soybean oil, and 2.7 kg. of dioctyl thio tin were added. The autoclave was closed and 70 kg. of vinyl chloride monomer were injected. The mass was heated rapidly at 60° C. in about 10 minutes and agitation was continued for 15 minutes at that temperature before releasing unreacted vinyl chloride. The release took about 15 minutes and the stripping of the product of occluded gas was completed by several operations of vacuum. The total period of degassing was about 30 minutes. The composition was granular, dry, nontacky, homogeneous and ready for use. It flowed readily through mold orifices and gave a good yield in a pneumatic bottle forming machine.

EXAMPLE 8

This example ilustrates the preparation of homogeneous granular products in which the admixture of the working adjuvants and the homogenization takes place directly at the end of the polymerization in the autoclave, the operation of polymerization properly so called having been effectuated in two steps of prepolymerization and final polymerization in apparatus described in French Patent No. 1,382,072.

A vertical prepolymerizer of 200 l. capacity, made of stainless steel, provided with a bicone, propeller type agitator 80 mm. in diameter received 170 kg. of vinyl chloride and 27.2 g. (0.016%) of azodiisobutyronitrile. The speed of rotation of the agitator was set at 1420 r.p.m. The temperature of the reaction medium was set at 62° C. which produced a relative pressure of 9.5 bars. After 3 hours of prepolymerization the mixture of monomer and polymer was transferred by gravity through a stainless steel tube to an autoclave of 500 l. capacity similar to that described in Example 5. Before the transfer from the prepolymerizer the second autoclave was free of oxygen by vaporizing 20 kg. of vinyl chloride monomer in it. The transfer from the prepolymerizer to the polymerizer took less than a minute. The temperature in the second reactor was set at 62° C. which established a relative internal pressure of 9.5 bars. The speed of the agitator was set at 30 r.p.m.

The polymerization was continued for 12 hours 45 minutes after which 2 kg. of lime stearate were added as a stabilizer with 800 g. of vegetable wax as a lubricant. The agitation was again continued for 30 minutes and the unreacted vinyl chloride was vented and recovered. The yield was 70% of a powdery composition directly useful for the production by molding and extrusion of rigid objects.

EXAMPLE 9

This example describes the preparation of a copolymer of vinyl chloride and vinyl aceate to produce a product suitable for molding into disks. The autoclave was similar to that of Example 5. It received 100 parts by weight of a copolymer of 85 parts of vinyl chloride and 15 parts of vinyl acetate, the Afnor index of viscosity of which was 60. The mixer rotated at 30 r.p.m. 1 part of calcium stearate, 0.5 parts of dibasic lead stearate, and 1% of finely divided carbon black were added. The autoclave was closed and 45 parts of vinyl chloride were injected. The temperature was raised to 60° C. in 10 minutes, and agitation continued for 15 minutes at 60° C. The autoclave was vented, the product was evacuated several times within 15 minutes, and withdrawn. It was dry, nontacky, homogeneous, capable of immediate use, the additives being uniformly distributed, and the disks formed by molding were perfect in homogeneity and irreproachable in appearance.

EXAMPLE 10

This example describes the blending of a copolymer with a homopolymer, the first being the product of polymerization in suspension and the latter of polymerization in mass.

25 kg. of vinyl chloride-vinyl acetate copolymer powder (95–5) having an Afnor index of 100, and 75 kg. of polyvinyl chloride powder of K wert 75 from polymerization in mass were put in the autoclave with agitation at 30 r.p.m. 80 kg. of dioctyl phthalate, 3 kg. of ethylhexyl epoxy stearate, 1.5 kg. of barium-cadmium laurate, 0.5 kg. of decyl diphenyl phosphite, and 1 kg. of stearic acid were added and the autoclave was closed. 50 kg. of ethyl chloride were added, the temperature was raised to 80° C. for 15 minutes at 4.2 bars. The last traces of ethyl chloride were eliminated by three treatments under vacuum. The total degassing time was about 40 minutes.

The product was a dry powder that flowed very well and did not form lumps in storage.

EXAMPLE 11

This example describes the preparation comprising vinyl chloride-vinyl acetate copolymer and vinyl chloride homopolymer in a ratio of 25 parts to 75 parts. The apparatus used was that of Example 1. The autoclave received 25 kg. of the copolymer in which the ingredients were in a ratio of 95 parts by weight of vinyl chloride to 5 parts of vinyl acetate. The Afnor index of viscosity was 100. The copolymer was obtained by polymerization in suspension and the homopolymer by polymerization in mass to a K index of 75. The agitator was started and run at 30 r.p.m. 80 kg. of dioctylphthalate, 3 kg. of ethylhexyl epoxystearate, 1.5 kg. of barium-cadmium laurate, 0.5 kg. of decyl diphenyl phosphite, and 1 kg. of stearic acid were added. The autoclave was closed and 50 kg. of trichloromonofluoromethane were injected. The mass was rapidly heated to 80° C., the internal pressure being 2.5 bars. The agitation continued about 15 minutes and the last traces of trichlorofluoromethane were eliminated by three treatments under vacuum in 15 minutes. The total duration of degassing was about 40 minutes. The polymer was a dry powder which poured well and did not form lumps during storage. It had characteristics about equivalent to similar compositions prepared by using monomeric vinyl chloride as organic liquid carrier.

EXAMPLE 12

This example describes the preparation of the composition from polyvinyl chloride and a grafted copolymer using the apparatus of Example 1.

The autoclave received 135 kg. of polyvinyl chloride of the type produced in mass, having a K index of 56, and 15 kg. of grafted copolymer which had been formed by polymerizing 40 parts of butadiene and 10 parts of acrylic nitrile on 50 parts of polyvinyl chloride. The agitator was run at 30 r.p.m. and 3 kg. of glycerol monoricinoleate, 0.9 kg. of a cetyl palmitate, 3 kg. of epoxidated soybean oil and 2.7 kg. of dioctyl thio tin were added. The autoclave was closed and 70 kg. of trichlorofluoromethane were injected. The temperature was raised to 80° C. under 3.2 bars pressure. The mixing continued for 15 minutes, and the last traces of trichloromonofluoromethane were eliminated by three applications of vacuum in 15 minutes. The total time required for degassing was 40 minutes. The powdery polymer thus produced was dry, homogeneous and ready for use.

In each of the products produced in the foregoing examples each particle of the polymer was homogeneously impregnated with working adjuvants. In cases where different polymers were mechanically intermixed before the impression with suspended or dissolved working adjuvants homogeneity was also obtained, producing uniform particles containing both ingredients. It is regarded as surprising that so simple a process should be equally effective with such diverse compositions and ingredients. It is equally astonishing that the polymer grains should be capable of absorbing and homogeneously accepting all the ingredients. It is equally surprising that so large a class of organic carrier liquids should be effective, including halogenated hydrocarbons, such as vinyl chloride, methyl chloride, methylene chloride, ethyl chloride, methyl bromide, and the halogenated hydrocarbons containing fluorine. The process works well with organic carrier liquid loaded with impregnates in weights from 20% to 150% of the weight of the polymers, preferably between 30% and 100%. It is advantageous to screen and degas the polymer before the operation. The operation proceeds well at temperatures from 50°–100° C., but temperatures between 60° and 80° C. are preferred.

The products produced include not only those in which the grains absorbed the working adjuvants from the carrier liquid, and those in which different polymers were homogeneously intermixed one with another while absorbing the working adjuvants, but those in which polymerization proceeded while the process of sorption was proceeding.

As many apparently widely different embodiments of the present invention may be made without departing from the spirit and scope thereof, it is to be understood that the invention is not limited to the specific embodiments.

What is claimed is:

1. A method of preparing polymer grains comprising polyvinyl chloride complete with incorporated working adjuvants which comprises polymerizing vinyl chloride in mass under conditions of temperature, pressure, catalysis, and agitation favorable to the production of a granular product, and when the polymerization has been carried out adding the working adjuvants thereto under pressure, together with liquid monomeric vinyl chloride in which the adjuvants are from dispersable to soluble and the polymer is insoluble, mixing until the adjuvants are homogeneously dispersed in the polymer, and removing the organic carrier therefrom by vaporization and vacuum.

2. The method of incorporating working adjuvants into a polymer of vinyl chloride which comprises polymerizing in mass the monomeric vinyl chloride with agitation to the final state of polymerization, adding working adjuvants under pressure to the reaction mass in the presence of liquid monomer with continued agitation, and after loading of the polymer removing any residual monomer from the product by vaporization and vacuum.

3. The method of claim 1, in which the organic carrier in the liquid state constitutes from about 30% to about 100% of the weight of the polymer composition at a temperature in the range 60°–80° C.

4. A method of loading finely divided thermoplast comprising a polymer composition having a base of vinyl chloride with its working adjuvants which comprises mingling the adjuvants in an organic carrier in the liquid state in which they are from dispersible to soluble and the thermoplast is insoluble, permeating under pressure the granular mass with the liquid and impregnating the particles of the thermoplast with the adjuvants by sorption, by agitating and intimately intermixing the particles and the organic carrier in the liquid state in contact with each other, and removing the stripped organic carrier by vaporization and degassing.

5. A method according to claim 1, in which the organic carrier in the liquid state is a halogenated hydrocarbon.

6. A method according to claim 2, in which the organic carrier in the liquid state is vinyl chloride.

7. A method according to claim 2, in which the organic carrier in the liquid state is ethyl chloride.

8. A method according to claim 2, in which the organic carrier in the liquid state is a chlorinated and fluorinated hydrocarbon.

9. A method according to claim 2, in which the organic carrier in the liquid state is trichloromonofluoromethane.

References Cited

UNITED STATES PATENTS

| | | | |
|---|---|---|---|
| 2,711,401 | 6/1955 | Lally | 260—45.75 |
| 3,378,518 | 4/1968 | Doyle | 260—45.95 |
| 2,600,695 | 6/1952 | Sans | 260—92.8 |
| 2,597,987 | 5/1952 | Harding | 260—45.75 |
| 2,643,988 | 6/1953 | Walter | 260—45.75 |

JOSEPH L. SCHOFER, Primary Examiner

J. A. DONAHUE, Jr., Assistant Examiner

U.S. Cl. X.R.

260—87.1, 87.5